Feb. 28, 1939.  W. MÜLLER ET AL  2,148,636
FILM FEED MECHANISM FOR PHOTOGRAPHIC ROLL FILM CAMERAS
Filed Feb. 12, 1938  3 Sheets-Sheet 1

Inventors.
Walter Müller.
Wilhelm Priesemann.

Attorney.

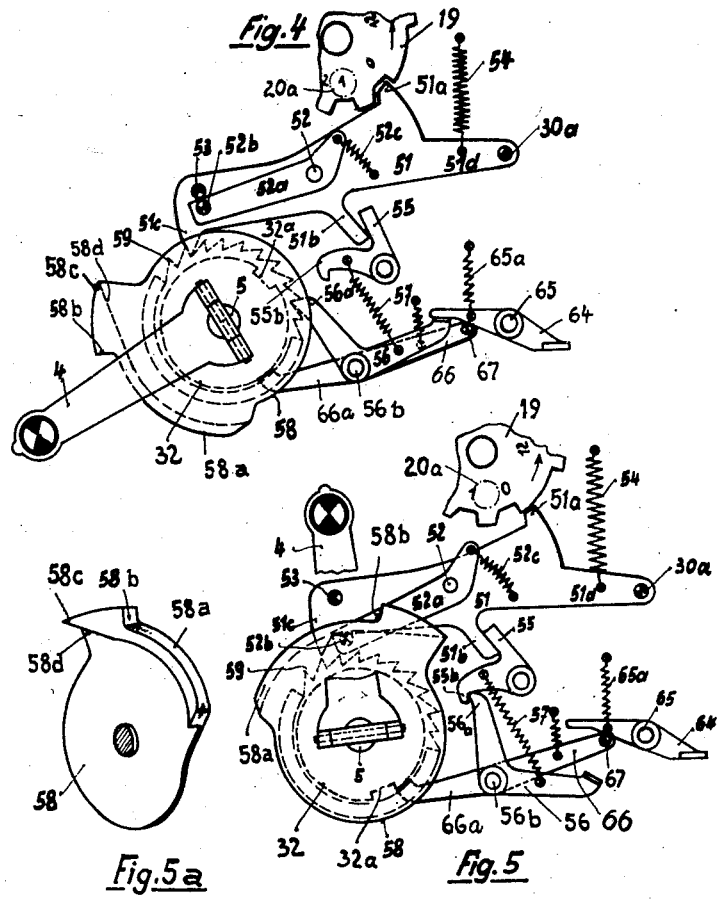
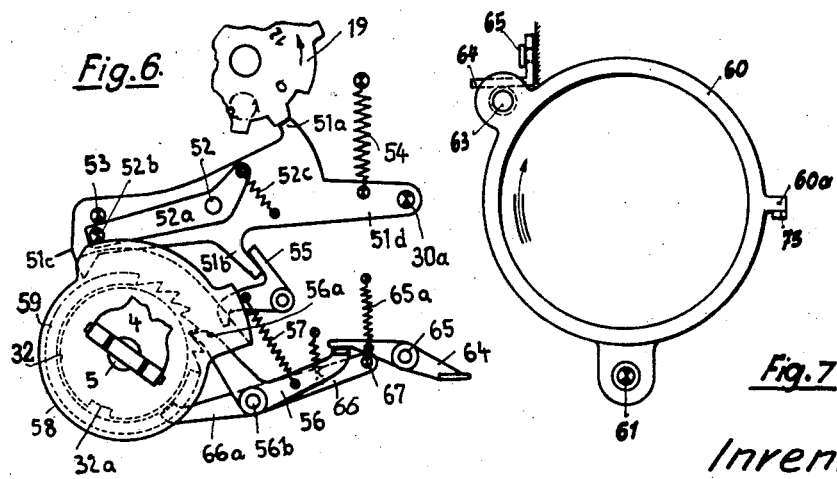

Patented Feb. 28, 1939

2,148,636

UNITED STATES PATENT OFFICE 2,148,636

FILM FEED MECHANISM FOR PHOTOGRAPHIC ROLL FILM CAMERAS

Walter Müller and Wilhelm Priesemann, Braunschweig, Germany, assignors to Franke & Heidecke Fabrik Photographischer Präzisionsapparate, Braunschweig, Germany, a Kommandit-Gesellschaft of Germany Application February 12, 1938, Serial No. 190,312
In Germany February 20, 1937

27 Claims. (Cl. 95—31)

The invention relates to film feed mechanism for roll film photographic cameras of the kind in which the ridge formed by the joint of the paper lead or backing and the film is adapted by actuating an abutment in the form of a finger or feeler to lock the winding mechanism when the first section of the film has been brought to position for exposure.

A feature of the present invention consists in the coaction between said ridge and the abutment being adapted to cause a drive derived from the winding operation to be coupled to a film feed controlling device by which the successive feed movements involved in bringing the first and the succeeding film sections to position for exposure are determined during the winding up of the film onto a take-up spool, and the arrangement being such that the film feed controlling device remains disengaged from its drive during the winding up of the major portion of the paper lead so that the paper lead is wound up to bring the first film section to position for exposure by continuous turning of the winding handle in the same direction, and the succeeding film feed movements being effected by swinging movement of the winding handle under the control of the film feed controlling device. By this means the winding of the film is considerably facilitated and expedited, particularly as regards bringing the first film area to position for exposure. The above mentioned drive adapted to be transmitted to the film feed controlling device may comprise a friction wheel engaging the backing of the film and adapted to transmit its drive to said device through the medium of gearing.

The abutment actuated by the ridge is advantageously in the form of a roller carried by a lever and coacting with a complementary stationary roller, the arrangement being such that the film passes between said rollers, and the ridge on engaging the roller on the lever moves said roller clear of the stationary roller, thereby rocking the lever whereby the drive is moved through linkage to engaging position, and means are preferably provided whereby the moved roller is held in such position so that it cannot contact with, and thereby possibly damage the film during the feed movements of the film.

A further feature consists in the cover or back of the camera—hereinafter referred to as the camera back—being also adapted on being closed after reloading of the camera to cause the drive to be restored to disengaging position, and it also effects restoration of the moved roller to its initial position for engagement by the ridge.

The invention also comprises means whereby the possibility of one or more film sections being accidentally left unexposed is eliminated, for which purpose detent means adapted to prevent winding up the film to bring a fresh section of the latter to position for exposure until the shutter has been operated are provided.

Further features of the invention are hereinafter described and pointed out in the appended claims.

The invention is illustrated in the accompanying drawings in which:

Figs. 4, 5 and 6 show part of the film feed mechanism in different positions.

Fig. 5a shows a detail in perspective and

Fig. 7 is a side view of a detail.

Figure 1:
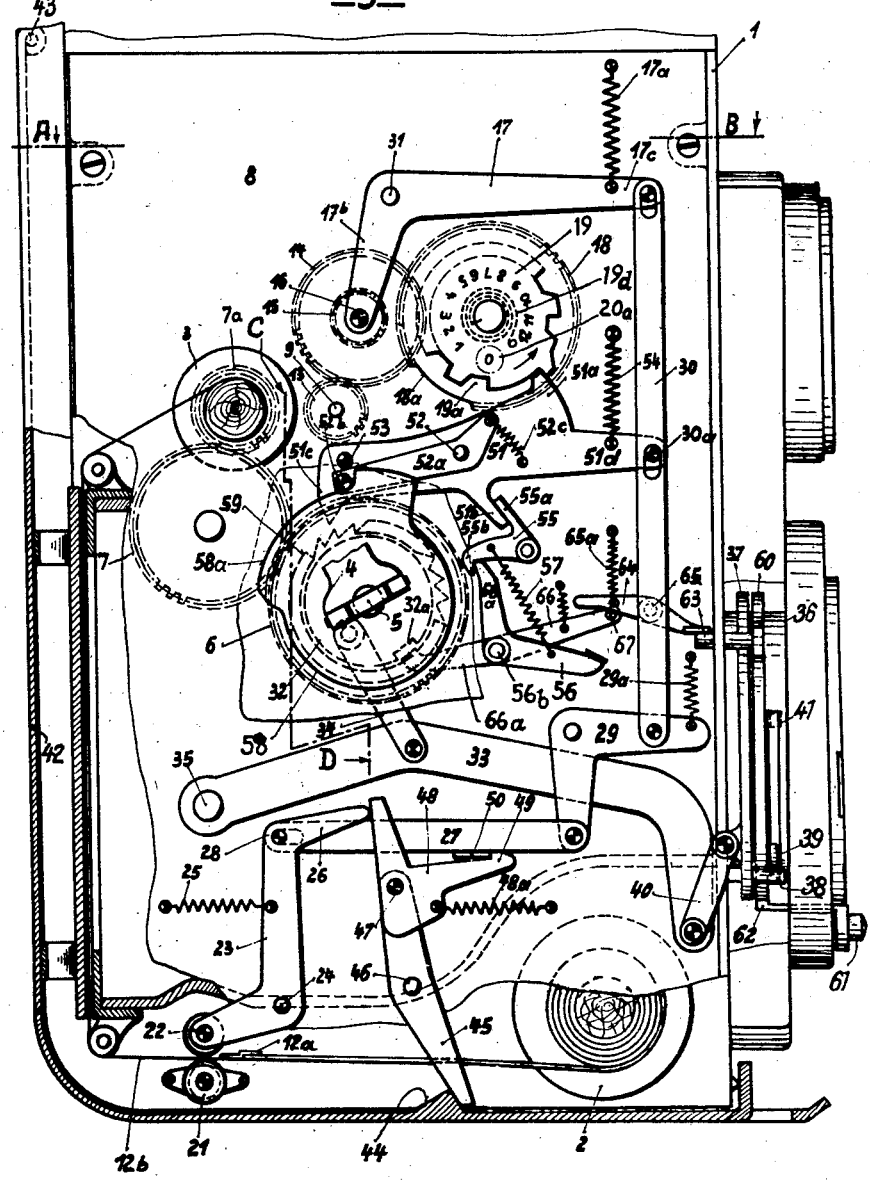
Fig. 1 is a side view of the interior of a photographic camera showing the film feed mechanism.

Referring to the drawings, 1 designates a camera shown by way of example as one of the type comprising a view-finder lens arranged above the taking lens. 3 designates the take-up spool which is rotated by means of a winding crank handle 4 fixed to a spindle 5 on which is mounted a gear wheel 6 which drives the take-up spool 3 through gear wheels 7, 7a, the spindle of gear wheel 7a being adapted to be engaged with the take-up spool in conventional manner. The gear wheel 6 is loose on spindle 5 and rotated clockwise by the winding handle 4 through a free wheel device (not shown) of any conventional design. Engaging the backing of the film 12 wound on the take-up spool is a friction wheel 11 (Fig. 2) fixed to a shaft 9 mounted by means of a ball and socket joint 10 in the wall 8 of the camera casing, said shaft 9 being carried at its other end by a spring 11a by which said wheel 11 is pressed against the backing 12 which, during the winding up of the film, consequently rotates the wheel 11 and thereby the shaft 9. On the shaft 9 is fixed a gear wheel 13 which drives a gear wheel 14 fixed to a spindle 16 on which is also fixed a gear wheel 15. The spindle 16 is carried by one arm 17b of a bell crank lever 17 which is rocked about its pivot 31 by means hereinafter described, such rocking movement in one direction (to the right in Fig. 1) causing the gear wheel 15 to mesh with a gear wheel 16.

To the gear wheel 18 is fixed a disc 19 adapted to control the feed of the film, and it is provided for this purpose with a number of notches 19a as shown. Said disc is also provided with a series of numerals which serve to indicate the number of exposures made and which, as the film is wound up section by section appear successively in a window 20a provided in the outer casing wall 20 of the camera. 2 designates the supply spool from which the film passes between two rollers 21, 22 to the take-up spool 3. The roller 22 is carried by one arm of a lever 23 pivoted at 24. The lever 23 is under the influence of a spring 25 tending to hold the roller 22 in engagement with the film. The lever 23 is connected by a pin and slot connection 28 to a link 27 which is pivotally connected to a bell crank lever 29 which is spring-loaded at 29a, and is in turn pivotally connected to one end of a link bar 30; the other end of the latter is connected by a pin and slot connection to an arm 17c of the lever 17 which is under the influence of a spring 17a tending to rock said lever anticlockwise and thereby bring gear wheel 15 into mesh with gear wheel 18. To the spindle 5 is also fixed a disc 32 provided with a notch 32a and to said disc is connected a link 34 connected at its other end to a lever 33 pivoted at 35. On the mount 36 of the taking lens is rotatably mounted a ring 37 which carries a pin 38 which engages the underside of the tensioning lever 39 of the lens shutter. The lever 33 is connected to the ring 37 by a link 40, so that when the handle 4 is turned the shutter is tensioned by the lever 39 being moved upwards by a pin 38 through the medium of the members 34, 33, 40, 37 to the upper position shown in broken lines at 41, said lever 39 remaining in this position until the shutter is released.

Figure 2:
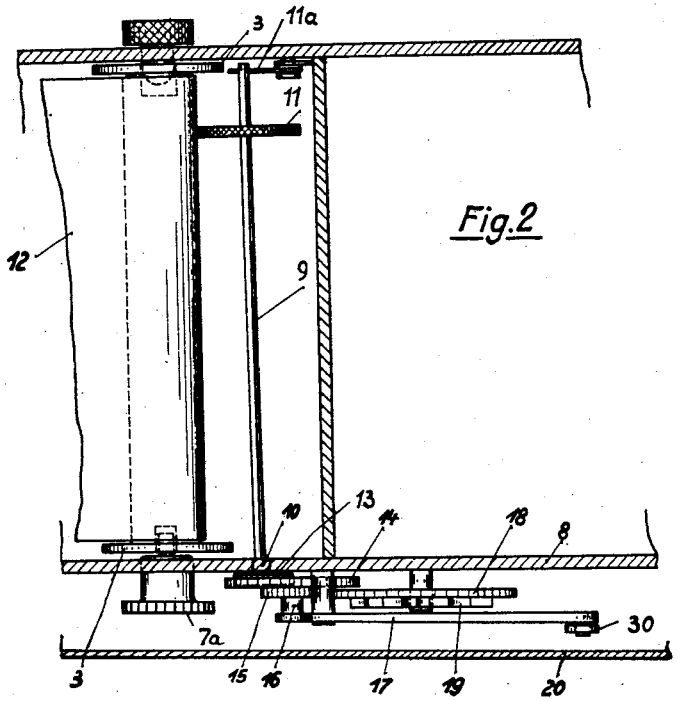
Fig. 2 is a plan view on the line A—B of Fig. 1 viewed in the direction indicated.
Figure 3:
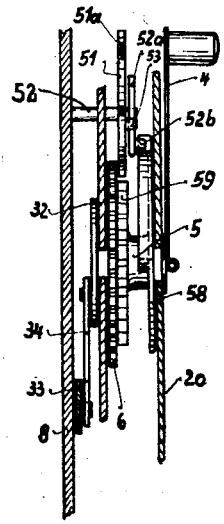
Fig. 3 is a vertical section on the line C—D of Fig. 1.

The back 42 of the camera is hinged at 43 to the camera casing and is provided with a projection 44 which, when said back is closed (Fig. 1, engages one arm of a lever 45 pivoted at 46. To said lever 45 is pivoted at 47 a latch 48 in the form of a bell crank one arm of which has a hooked end 49 which is held by a spring 48a in engagement with a projection 50 on the link 27. Also pivoted to the side of the casing at 52 is a detent lever 51 which is provided with a tooth 51a and is under the influence of a spring 54 tending to rock said lever anticlockwise so that when during the rotation of the notched disc 19 a notch 19a therein arrives opposite the tooth 51a the latter will engage therein and consequently allow the lever 51 to rock so that a tooth 51c thereon will engage a ratchet wheel 59 on spindle 5 and thereby prevent further rotation of the crank handle. The return movement of the lever 51 to disengaging position is effected by the lobe 58a of a cam 58 fixed to the spindle 5 and acting on lever 51 through the medium of a lever 52a spring loaded at 52c and pivoted to lever 51 at 52, a pin 52b on lever 52a engaging the cam 58, and a pin 53 on lever 52a engaging the top edge of the lever 52a. The lever 51 also has an arm 51b coacting with one arm 55a of a pivoted latch 55. The latter serves to hold in ineffective position a pawl 56, the hooked end 55b of said latch engaging the arm 56a of said pawl, and the latter being pivoted at 56b and being adapted when released by the latch to engage the ratchet wheel 59. With the pawl 56 also coacts a rocker 64 pivoted at 65, one arm of said rocker being adapted to engage the pawl 56, and the other arm coacting with a pin 63 on a ring 60.

The latter is rotatably mounted on the mount 36 of the lens and is provided with a lateral extension 62 terminating in a hand knob 61 by which said ring 60 may be rotated on the member 36. The ring serves to operate the shutter release lever 75 (Fig. 7), and is provided for this purpose with an arm 60a; to operate the shutter release lever the ring 60 is turned clockwise on the mount 36 by means of the knob 61 so that the arm 60a presses down the lever 75, thereby operating the shutter.

Also pivoted at 56b is a detent lever 66 one arm 66a of which can engage in a notch 32a in the disc 32 on the spindle 5, and the other arm of said lever is provided with a pin 67 which engages the rocker 64.

Thus, so long as the notch 32a is out of alignment with the arm 66a and of lever 66 it will not be possible to operate the shutter because turning of the ring to operate lever 75 is prevented by the rocker 64 engaging the pin 63, said rocker being in turn held against movement by the lever 66 which is unable to move owing to its arm 66a engaging the unnotched portion of the periphery of the disc 32. At the end of each feed movement of the film, however, the notch 32a arrives opposite the arm 66a so that the ring can then be rotated to operate the shutter, inasmuch as the rocker can then be rocked due to the arm 66a engaging in the notch 32a. By this means actuation of the shutter is prevented until the full feed movement of the film has been completed, and it consequently prevents sections of film shorter than prescribed being exposed.

The cam lobe 58a terminates at one end in a shoulder 58b forming a stop for the pin 52b and said lobe has a lateral extension terminating in an edge 58c (Fig. 5a), and presenting on its underside a cam face 58a adapted to engage the pin 52b on lever 52a in the manner hereinafter described.

The operation of the mechanism is as follows:
After opening the camera back 42 and fitting the full film spool 2 in the camera, the paper lead 12b projecting beyond the film is passed between the rollers 21, 22 and connected in known manner to the take-up spool 3. When the back 42 is opened the lever 23 is rocked clockwise by the linkage 27, 29 under the influence of spring 29a, and the lever 45 and latch 48 swing clockwise from the position shown due to spring 48a the lever 45 losing its support 44, so that the roller 22 is lifted clear of the roller 21, thereby facilitating the passage of the paper strip between said rollers. When the back 42 is closed again the projection 44 thereon engages the lever 45 so that the latter is rocked anticlockwise to the position shown in Fig. 1, the latch 48 during this movement being similarly rocked so that its nose 49 engages behind the projection 50 on link 27 and pulls the latter to the left. The lever 23 is consequently rocked anticlockwise by the spring 25 so that the roller 22 is lowered onto the paper strip 12b. This movement of the link 27 also causes the bell crank lever 29 to be rocked clockwise so that the link bar 30 is pulled down and the arm 17b of lever 17 is rocked clockwise against spring 17a. This position of the linkage is shown in Fig. 1. This also results in the gear wheel 15 being disengaged from gear wheel 18 and as a result the latter and the disc 19 are rotated by means of a coil spring 19d, to occupy the initial position shown in Fig. 1. It is conceivable that the camera back 42 might be closed when the handle 4 is in a different position to that shown in Fig. 1, i. e. its initial position so that the projection 51a would due to spring 54, press so hard against the unnotched part of the disc 19 as to prevent the disc from being rotated by its spring 19d. To avoid such an occurrence the arm 51d will be moved downwards by the link 30 pushing down the pin 30a upon the cover being closed and will occupy the position shown in Fig. 1. This ensures the return of the disc 19 to its initial position by spring 19a, so that the numeral 0 on the disc will appear in the window 20a in the casing.

To now bring the film into position for the first exposure—which will be indicated by the numeral 1 on disc 19 appearing in window 20a—the handle 4 is turned clockwise so that the take-up spool 3 is rotated by gears 6, 7, 7a to wind up the paper lead 12b and film; the wheel 11 is consequently rotated by the film backing paper on spool 3 and transmits its drive by way of gears 13, 14 to gear wheel 15, but the latter runs idly because it is still disengaged from gear wheel 18. The shutter will also be tensioned by such turning of the handle, the rotation of the disc 32 causing the lever 33 to be rocked by link 34 as previously described, with consequential rotation of ring 37 by link 40, so that the shutter tensioning lever 39 will be moved to the position 41 and will remain in this position until the shutter is operated.

After a few turns of the handle the ridge 12a formed by the joint connecting the film to the backing paper passes between the rollers 21, 22 so that roller 22 is raised and the arm 26 of lever 23 is consequently moved downwards. This will cause said arm to rock the latch 48 clockwise from the position shown, with consequential disengagement of the latch hook 49 from the projection 50 on lever 27. The springs 17a and 29a are now able to act, the spring 29a causing the bell crank lever 29 to rock anticlockwise so that it pulls the link 27 to the left and the latter through pin 28 rocks the lever 23 so that the roller 22 is lifted clear of the film, thus preventing the latter from being subjected to the pressure of roller 22 which might damage the emulsion. At the same time the spring 17a pulls up the link 30 and causes the arm 17b of lever 17 to swing to the right whereby the gear wheel 15 is meshed with the gear wheel 18. The notched disc 19 is consequently rotated in the direction indicated by the arrow by the continued turning of the handle 4, the friction wheel 11 now transmitting its drive by gears 13, 14, 15 to the gear 18 fixed to disc 19. When the film has been wound up to such an extent as to bring the first section thereof in position for exposure, the numeral 1 on disc 19 then appearing in window 20a, the disc 19 will have been rotated to such an extent that the tooth 51a of the lever 51 will be caused by spring 54 to engage in the first notch 19a. This consequential movement of lever 51 will result in the tooth 51c on lever 51 engaging with the ratchet wheel 59 as shown in Fig. 4, so that the film feed will be stopped. As the lever 51 drops into engagement with the ratchet wheel 59 the projection 51b on the lever 51 will move to the right and rock latch 55 so that the nose 55b is lifted to release the pawl 56 which, under the influence of spring 57, will also engage the ratchet wheel 59 with its nose 56a (Fig. 4).

The first film section being now in position for exposure the handle 4 is then turned back anticlockwise to its original position which results in the cam lobe 58a lifting the pin 52b and consequently the rocker 52a which in turn engages pin 53 and thereby rocks the lever 51 so that the latter is disengaged from the ratchet wheel 59. Fig. 6 shows the position of the mechanism at the commencement of such return movement of the handle and such return movement is limited by the shoulder 58b engaging the pin 52b as shown in Fig. 1.

The succeeding film feed movements are produced by a backward and forward movement of the handle 4, each of such movements producing a feed movement. Such movement of the handle is, however, prevented by the pawl 56 which is still engaged with the ratchet wheel 59, and to effect disengagement of the pawl it is necessary to operate the shutter. This is done, as previously described, by turning the ring 60 by means of knob 61 so that the shutter release trigger 75 is operated. Such movement of the ring 60 results in the pin 63 rocking the rocker 64 anticlockwise whereby the pawl 56 is rocked clockwise out of engagement with the ratchet wheel 59 and is caught by the hooked end of the latch 55. This device thus prevents the possibility of film sections being inadvertently left unexposed inasmuch as a fresh film section cannot be fed to position for exposure until the previous one has been exposed. Moreover, the shutter cannot be operated unless the disc 32 has been turned sufficiently to bring its notch 32a opposite the arm 66a, as hereinbefore described.

During the turning of the handle clockwise to bring the first film section to position for exposure as above described, the engagement of the lever 51 with the ratchet wheel 59 at the appropriate moment might be prevented by the cam 58 being in such a position that its lobe 58a is disposed underneath the pin 52b. This would result in the film being wound up too far, and is prevented by the additional cam surface 58d referred to hereinbefore which acts as follows: As the handle is turned clockwise the point 58c of the cam engages between the pins 53 and 52b, and the latter engages the face 58d of the cam (Fig. 5). The lever 51 is, therefore, able to engage the ratchet wheel due to the rocker 52a being pulled down by cam face 58d out of the way of the pin 53, said cam face being suitably curved to effect this. The rocker 52a is returned to its initial position by the spring 52c.

After the exposure of the last film section the drive from gear wheel 15 to gear wheel 18 is discontinued due to the latter presenting a section 18a devoid of teeth. Consequently the feed control disc is no longer rotated and the handle 4 can be freely turned until the whole film has been wound onto the spool 3.

What we claim as our invention and desire to secure by Letters Patent of the United States is:—

1. In a roll film photographic camera the combination of film winding mechanism, a manually actuatable member for operating said winding mechanism, film feed controlling means adapted to effect the locking of said winding mechanism as each film area arrives in position for exposure, means for effecting the unlocking of said winding mechanism, driving gear the drive of which is derived from the film winding mechanism, and means actuatable by a ridge on the film strip for coupling said driving gear with said feed controlling means so that the latter is put into operation.

2. In a roll film photographic camera the combination, of film winding mechanism, a manually actuatable member for operating said winding mechanism, film feed controlling means adapted to effect the locking of said winding mechanism as each film area arrives in position for exposure, means for effecting the unlocking of said winding mechanism, driving gear the drive of which is derived from the film winding mechanism, and means actuatable by a ridge at the joint between the film and the paper lead for coupling said driving gear with said feed controlling means during the winding up of the paper lead.

3. In a roll film photographic camera the combination of film winding mechanism, a manually oscillatable member for operating said winding mechanism, film feed controlling means adapted to effect the locking of said winding mechanism as each film area arrives in position for exposure, driving gear the drive of which is derived from the film winding mechanism, and means actuatable by a ridge at the joint between the film and the paper lead for coupling said driving gear with said feed controlling means so that the latter is put into operation, said manually actuatable member being adapted to be turned unidirectionally until the locking of said winding mechanism is effected, and means actuated by reverse turning of said manually actuatable member for effecting the unlocking of said winding mechanism.

4. In a roll film photographic camera comprising a casing member openable for loading and unloading of the camera the combination of film winding mechanism, a manually actuatable member for operating said winding mechanism, film feed controlling means adapted to effect the locking of said winding mechanism as each film area arrives in position for exposure, driving gear the drive of which is derived from the film winding mechanism, means actuatable by a ridge on the film strip during the winding up of the film paper lead for coupling said driving gear with said feed controlling means so that the latter is put into operation and means actuatable by said casing member for restoring said driving gear to uncoupled position upon the closing of said casing member.

5. In a roll film photographic camera the combination, of film winding mechanism, a manually actuatable member for operating said winding mechanism, film feed controlling means adapted to effect the locking of said winding mechanism as each film area arrives in position for exposure, driving gear for said film feed controlling means, a power source tending to couple said driving gear with said film feed controlling means to put the latter into operation, latching means adapted to restrain such coupling of said driving gear, during the winding up of the paper lead and means actuatable by a ridge on the film strip for disabling said latching means during the winding up of the film paper lead whereby said driving gear is coupled with said film feed controlling means.

6. In a roll film photographic camera the combination of film winding mechanism, a manually actuatable member for operating said winding mechanism, film feed controlling means adapted to be driven to effect the locking of said winding mechanism as each film area arrives in position for exposure, driving gear the drive of which is derived from the film winding mechanism, an abutment actuatable by a ridge on the film strip for effecting driving engagement of said driving gear with said film feed controlling means, said abutment being adapted to contact with the film strip and to be raised clear of the latter when actuated by said ridge, and means for holding said abutment in its raised position during the subsequent winding up of the film.

7. In a roll film photographic camera comprising a casing member openable for loading and unloading of the camera, the combination of film winding mechanism, a manually actuatable member for operating said winding mechanism, film feed controlling means adapted to be driven to effect the locking of said winding mechanism as each film area arrives in position for exposure, driving gear the drive of which is derived from the film winding mechanism, an abutment actuatable by a ridge on the film strip for effecting driving engagement of said driving gear with said film feed controlling means, said abutment being adapted to contact with the film strip and to be raised clear of the latter when actuated by said ridge, means for holding said abutment in its raised position during the subsequent winding up of the film, and means actuatable by said casing member for restoring said abutment to contacting position with said film strip upon the closing of said casing member.

8. In a roll film photographic camera the combination of film winding mechanism, a manually actuatable member for operating said winding mechanism, film feed controlling means adapted to effect the locking of said winding mechanism as each film area arrives in position for exposure, driving gear for said film feed controlling means, a roller adapted to be moved by a ridge on the film strip and means for transmitting such movement of said roller to said driving gear so that the latter is moved into driving engagement with said film feed controlling means.

9. In a roll film photographic camera the combination, of film winding mechanism, a manually actuatable member for operating said winding mechanism, film feed controlling means adapted to effect the locking of said winding mechanism as each film strip section arrives in position for exposure, a driving element deriving its drive from the film winding mechanism, an abutment adapted to coact with a ridge presented by the film and formed by the joint of the latter with the paper lead, a lever carrying said abutment, coupling means operatively connecting said lever with said driving element, a power source tending to move said coupling means from an initial position to effect driving engagement of said driving element with said film feed controlling means, and latching means acting on said lever to counteract said power source, said ridge being adapted during actuation of winding mechanism to contact with and thereby rock said lever, whereby said latching means is disabled.

10. In a roll film photographic camera comprising a casing member openable for loading and unloading of said camera the combination, of film winding mechanism, a manually actuatable member for operating said winding mechanism, film feed controlling means adapted to effect the locking of said winding mechanism as each film strip section arrives in position for exposure, a driving element deriving its drive from the film winding mechanism, an abutment adapted to coact with a ridge presented by the film and formed by the joint of the latter with the paper lead, a lever carrying said abutment, coupling means operatively connecting said lever with said driving element, a power source tending to move said coupling means from an initial position to effect driving engagement of said driving element with said film feed controlling means, and latching means acting on said lever to counteract said power source, said ridge being adapted during actuation of the winding mechanism to contact with and thereby rock said lever whereby said latching means is disabled, means on said casing member whereby on closure of the latter said latching means is restored to its latching position, and means whereby said latching means during such return movement restores said lever and said coupling means with said driving element to initial position.

11. In a roll film camera comprising a lens shutter and releasing means therefor, the combination, of film winding mechanism, a manually actuatable member for operating said winding mechanism, means for automatically locking said winding mechanism as each film area arrives in position for exposure, means for then automatically unlocking said winding mechanism, detent means effective to prevent actuation of said shutter releasing means during the winding operation, and means for disabling said detent means at the conclusion of each winding operation to bring a film area to position for exposure.

12. In a roll film camera comprising a lens shutter and releasing means therefor, the combination, of film winding mechanism, a manually actuatable member for operating said winding mechanism, means for automatically locking said winding mechanism as each film area arrives in position for exposure, means for unlocking said winding mechanism, a disk rotated by said manually actuated member, a double armed lever one arm of which is adapted to obstruct actuation of said shutter releasing means, and the other arm of said lever being spring pressed to engage the periphery of said disk whereby said lever is held in obstructing position, and an opening in said disk so disposed as to arrive opposite the associated lever arm at the conclusion of each film feed movement, thereby permitting of rocking movement of said lever to unobstructing position.

13. In a roll film camera comprising a lens shutter and releasing means therefor, the combination of film winding mechanism, a manually actuated member for operating said winding mechanism, film feed controlling means adapted to effect the locking of said winding mechanism as each film area arrives in position for exposure, means for effecting the unlocking of said winding mechanism, driving gear the drive of which is derived from the film winding mechanism, means actuatable by a ridge on the film strip during the winding up of the paper lead for coupling said driving gear with said feed controlling means so that the latter is put into operation, detent means effective to prevent actuation of said shutter releasing means during the winding operation, and means for disabling said detent means at the conclusion of each winding operation to bring a film area to position for exposure.

14. In a roll film photographic camera comprising a lens shutter and releasing means therefor, the combination of film winding mechanism, means for operating said winding mechanism, detent means adapted to automatically arrest said winding mechanism as each film area arrives in position for exposure and whereby said shutter releasing means when actuated moves said detent means from arresting position to releasing position, said detent means being held in arresting position until so released.

15. In a roll film photographic camera comprising a lens shutter and releasing means therefor the combination, of film winding mechanism comprising a ratchet wheel, a manually actuatable member for operating said winding mechanism and by which said ratchet wheel is driven, a pawl coacting with said ratchet wheel, means whereby said pawl is engaged with said ratchet wheel to arrest the winding operation as each film area arrives in position for exposure and means whereby said shutter releasing means when actuated moves said pawl to disengaged position, said pawl remaining in engaged position until so released.

16. In a roll film camera comprising a lens shutter and releasing means therefor, the combination, of film winding mechanism including a ratchet wheel, a manually actuatable member adapted to be moved in one direction to operate said winding mechanism and by which said ratchet wheel is driven, pawl coacting with said ratchet wheel, means whereby said pawl is engaged with said ratchet wheel to arrest the winding operation as each film area arrives in position for exposure, a second pawl spring urged to engage said ratchet wheel, a catch restraining said second pawl from engagement, means whereby said catch is tripped by said first pawl on the latter moving to engaging position, means whereby said shutter releasing means when actuated moves said second pawl to disengaging position, and into engagement with said latch again, and means whereby said first pawl is returned to disengaging position upon reverse movement of said manually actuatable member.

17. In a roll film camera the combination, of film winding mechanism, a handle adapted to be moved in one direction for operating said winding mechanism, a ratchet wheel rotated by said winding handle, a pawl cooperating with said ratchet wheel, controlling means adapted to cause said pawl to move to engaging position to stop the winding operation as each film area arrives in position for exposure, driving gear the drive of which is derived from the film winding mechanism, means actuatable by a ridge on the film strip during the winding up of the paper lead for bringing said driving gear into driving engagement with said controlling means, and a cam driven by said handle and adapted upon reverse movement of the latter to restore said pawl to disengaged position.

18. In a roll film camera comprising a lens shutter and releasing means therefor, the combination, of film winding mechanism including a ratchet wheel, a manually actuatable member adapted to be moved in one direction to operate said winding mechanism and by which said ratchet wheel is driven, pawl coacting with said ratchet wheel, means whereby said pawl is engaged with said ratchet wheel to arrest the winding operation as each film area arrives in position for exposure, a second pawl spring urged to engage said ratchet wheel, a catch restraining said second pawl from engagement, means whereby said catch is tripped by said first pawl on the latter moving to engaging position, means whereby said shutter releasing means when actuated moves said second pawl to disengaging position, and into engagement with said latch again, and means whereby said first pawl is returned to disengaging position upon reverse movement of said manually actuatable member and preventative means for preventing said cam from possible restraining said pawl against engagement with said ratchet wheel to stop the winding operation on the first film section arriving in position for exposure.

19. The combination claimed in claim 18, wherein said preventative means comprising a spring loaded distance piece normally interposed between said cam and said pawl, and a cam groove on the side face of said cam adapted, during the rotation of said cam, to engage said distance piece so as to move the latter against the action of its spring away from said pawl, thereby allowing the latter to move to engaging position.

20. In a roll film photographic camera the combination, of film winding mechanism, including a take-up spool, a manually actuatable member for operating said winding mechanism, film feed controlling means adapted to effect the locking of said winding mechanism as each film area arrives in position for exposure, means actuated by said manually actuatable member for effecting the unlocking of said winding mechanism, a friction wheel, means inside said camera for supporting said friction wheel for rotation, spring means for holding said wheel in engagement with the film paper backing on said spool so that the latter drives said wheel during the winding operation, and means actuatable by a ridge on the film strip during the winding up of the film paper lead for transmitting the drive of said friction wheel to said feed controlling means.

21. In a roll film photographic camera comprising a lens shutter with means for tensioning the same the combination, of film winding mechanism, a manually actuatable member for operating said winding mechanism, the movement of said manually actuated member in one direction being effective for winding, film feed controlling means adapted to effect the locking of said winding mechanism as each film area arrives in position for exposure, means operated by reverse movement of said manually actuated member for unlocking said winding mechanism, driving gear the drive of which is derived from the film winding mechanism, means actuatable by a ridge on the film strip during the winding up of the film paper lead for coupling said driving gear with said feed controlling means so that the latter is put into operation, and means driven by said winding mechanism for actuating said shutter tensioning means to tension said shutter during each winding operation to bring a film area to position for exposure.

22. The combination claimed in claim 21, said means for tensioning said shutter comprising a collar adjacent said shutter tensioning lever, a ring rotatably mounted on said collar, an abutment on said ring adapted to engage said tensioning lever, a crank disk on said handle shaft and means operatively connecting said crank disk with said ring, so that on rotation of said crank disk by said handle said ring is rotated in one direction to actuate said tensioning lever and is then restored to its initial position.

23. In a roll film photographic camera the combination, of film winding mechanism, a hand crank adapted to be rotated in one direction for operating said winding mechanism, film feed controlling means including a rotary member, detent means actuated by said rotary member to arrest the winding mechanism as each film area arrives in position for exposure, a driven gear wheel fixed to said rotary member, a driving gear wheel, a carrier for said driving gear wheel, means driven by the film feed movement for driving said driving gear wheel, means actuatable by a ridge formed by the joint between the film strip and paper lead thereon for moving said carrier to bring the gear wheel on said carrier into engagement with said driven gear wheel, and means actuated by reverse rotation of said crank whereby said detent means is restored to initial position.

24. In a roll film photographic camera the combination of film winding mechanism a hand crank adapted to be rotated in one direction for operating said winding mechanism, film feed controlling means including a rotary member, detent means actuated by said rotary member to arrest the winding mechanism as each film area arrives in position for exposure, a driven gear wheel fixed to said rotary member, a driving gear wheel, a carrier for said driving gear wheel, a friction wheel spring pressed in contact with the film back, means for transmitting the drive of said friction wheel to said driving gear wheel, means actuatable by a ridge formed by the joint between the film strip and paper lead thereon for moving said carrier to bring the gear wheel on said carrier into engagement with said driven gear wheel, and means actuated by reverse rotation of said crank whereby said detent means is restored to initial position.

25. In a roll film photographic camera the combination, of film winding mechanism, means including a hand crank for operating said winding mechanism, a ratchet wheel driven by said crank, a disk, a series of notches in the periphery of said disk, a driven gear wheel fixed to said disk, a friction wheel spring pressed in contact with the film back, a driving gear wheel, means for transmitting the drive of said friction wheel to said driving gear wheel whereby said disk is rotated, a rocker carrier for said driving gear wheel, a pawl adapted to engage said notches in said disk sequentially as said disk is rotated and consequently engage said ratchet wheel to arrest said winding mechanism, means actuated by a ridge formed by the joint between the film strip and paper lead thereon for rocking said carrier to bring the gear wheel on said carrier into engagement with said driven gear wheel a cam actuated by the reverse movement of said crank whereby said pawl is restored to disengaging position, an abutment on said cam and a stop pin on said pawl adapted to be engaged by said abutment on such reverse movement of said crank.

26. In a roll film photographic camera the combination, of film winding mechanism, means including a hand crank for operating said winding mechanism, a ratchet wheel driven by said crank, a disk, a series of notches in the periphery of said disk, a driven gear wheel fixed to said disk, a friction wheel spring pressed in contact with the film back, a driving gear wheel, means for transmitting the drive of said friction wheel to said driving gear wheel whereby said disk is rotated, a rocker carrier supporting said driving gear wheel and spring urged to rock the latter into engagement with said driven gear wheel, latching means restraining such rocking movement, a pawl adapted to engage said notches in said disk sequentially as said disk is rotated and consequently engage said ratchet wheel to arrest said winding mechanism, means actuated by a ridge formed by the joint between the film strip and paper lead thereon for disabling said latching means, a cam actuated by the reverse movement of said crank whereby said pawl is restored to disengaging position, an abutment on said cam and a stop pin on said pawl adapted to be engaged by said abutment on such reverse movement of said crank.

27. In a roll film photographic camera the combination, of a film take up spool, a hand winding crank, a shaft on which said crank is fixed, means for transmitting the drive of said shaft to said take up spool, a ratchet wheel on said shaft, a cam on said shaft, a free wheel drive from said shaft to said ratchet wheel, a disk, a series of notches in the periphery of said disk, a driven gear wheel fixed to said disk, a friction wheel spring pressed in contact with the film back on said take-up spool, a driving gear wheel, means for transmitting the drive of said friction wheel to said driving gear wheel, a rocker carrier supporting said driving gear wheel and spring urged to bring the latter into engagement with said driving gear wheel, latching means restraining such rocking movement, a pawl adapted to engage said notches in said disk sequentially as said disk is rotated and simultaneously engage said ratchet wheel to arrest said winding mechanism, and means actuated by a ridge formed by the joint between the film strip and paper lead thereon for disabling said latching means, rotation of said crank in one direction being effective to wind the film and reverse movement rotating said cam to restore said pawl to disengaging position.

WALTER MÜLLER.
WILHELM PRIESEMANN.